United States Patent Office 3,562,095
Patented Feb. 9, 1971

3,562,095
SANDWICH STRUCTURE COMPRISING THERMO-
SETTING UNSATURATED POLYESTER CORE
AND FACE SHEETS OF CHLORINE CONTAIN-
ING THERMOPLASTIC POLYMER
Forrest J. Rahl, Dusan C. Prevorsek, and Hendrikus J.
Oswald, Morristown, N.J., assignors to Allied Chemical
Corporation, New York, N.Y., a corporation of New
York
No Drawing. Filed Mar. 21, 1967, Ser. No. 624,710
Int. Cl. B32b 27/08
U.S. Cl. 161—233                              10 Claims

ABSTRACT OF THE DISCLOSURE

A method for providing improved bonding in a sandwich structure which has (1) a thermosetting unsaturated polyester resinous core and (2) thermoplastic face sheets selected from the group consisting of polyvinyl chloride, chlorinated polyvinyl chloride and chlorinated polyethylene, the latter incorporating between about 0.1% and about 20% of a compound having one or more unsaturated $>C=C<$ groups.

---

This invention relates to synthetic plastic laminates comprising (1) a central layer or core of a thermosetting unsaturated polyester sandwiched between (2) face sheets of chlorine containing thermoplastic polymer to form a composite which may be cold-formed into suitable shapes and to the novel method of preparing said composites in which the bond between the lamina is substantially improved.

The preparation of thermoplastic-faced thermosetting laminates and forming techniques are disclosed in the copending application of Li et al., Ser. No. 604,255, filed on Dec. 23, 1966. The present invention relates to an improvement in the bonding characteristics of structures of this kind, in particular those having a polyester core, and a specified class of thermoplastic face sheets.

It is an object of the invention to provide a thermosettable composite which may readily be converted to desired shapes at ambient temperatures, comprising an unsaturated polyester core layer sandwiched between thermoplastic layers selected from the group consisting of polyvinyl chloride, chlorinated polyvinyl chloride and chlorinated polyethylene to produce a product having excellent bonding. The composite is of sufficient strength to permit a shape to be imparted to the composite and to be retained as the thermosettable layer is converted to the thermoset condition without requiring external constraint.

It is still another object of the invention to provide a composite laminate comprising a core of thermosetting composition and face sheets of thermoplastic composition of this kind which is capable of being cold-formed, at ambient temperatures, into useful shapes in an expeditious manner to produce a product having an excellent bond between the thermosetting core and thermoplastic face sheets.

Additional objects and advantages of the present invention will be apparent from the following description and claims.

Generally, in preparing the composite in accordance with the invention, the outer layers or face sheets, are layers of a thermoplastic material such as polyvinyl chloride, chlorinated polyvinyl chloride, chlorinated polyethylene, and the like, while the inner layer is preferably a crosslinkable material which may be reinforced and which contains at least in part a polymerizable mixture comprising an unsaturated polyester and at least one ethylenically unsaturated monomer. Resin compositions of this kind are well known (see, for example, U.S. Pat. 2,255,313, Ellis, Sept. 9, 1941; U.S. Pat. 2,628,209, Fisk, Feb. 10, 1953; U.S. Pat. 3,219,604, Fischer, Nov. 23, 1965, etc.) and are much used as laminating, molding and casting compositions, as well as in partially reacted compositions or "pre-pregs."

The desirability of producing laminated structures including a vinyl outer layer and a thermosetting strength imparting layer has been recognized by prior art (see, for example, U.S. Pat. 2,219,447, Groff, Oct. 29, 1940; U.S. Pat. 2,797,179, Reynolds, June 25, 1957). In addition to the desirable properties of these chlorine polymers, i.e., polyvinyl chloride, chlorinated polyvinyl chloride and chlorinated polyethylene as facing materials, these sheet stocks also have another important desirable characteristic in that when formed into composite laminate structures, they lend themselves advantageously to shaping at room temperature using high speed deep drawing techniques, as disclosed in the earlier mentioned Li et al. application Ser. No. 604,255. In this rapid forming technique, it is essential that the composition of the core, and the core to outer thermoplastic wall thickness ratio, be such that the laminate has, before curing, both sufficient ductility to be shaped in the deep drawing press and sufficient rigidity to allow the execution of various consecutive shaping and finishing operations without employing an external constraint. Accordingly, in this process for cold-forming the thermosetting-thermoplastic composite laminate, the outer walls of the composite have a multiple function; they provide the desired surface properties and characteristics, they represent an essential structural element contributing to the strength and ductility required for shaping, and they constrain and reinforce the core before and during shaping, and continue having this function until the core is converted into a rigid thermoset network.

The multitude of desired characteristics of various laminated structures consisting of selected thermoplastic and crosslinkable materials is therefore quickly apparent. The difficulty of combining these types of materials into a firmly bonded structure has also been recognized in that vinyl resins when molded against cured thermosetting resins normally do not adhere thereto. This bonding problem becomes even more critical when vinyl resins have to be bonded to crosslinkable resin compositions which are, before shaping, in an uncured reactive state, but which after shaping are completely converted into rigid networks by exposing the entire article to suitable polymerization conditions. In this latter case, the problem of securing good bonding lies in the fact that under normal circumstances the optimum conditions of temperature and time required to cause the crosslinkable resin composition to cure differ considerably from the conditions which result in optimum bonding. These bonding difficulties usually have been overcome in practice either by using special adhesives (see, for example, U.S. Pat. 2,569,954 to Ruebensaal, Oct. 2, 1951) or by the use of intermediate layers of fibrous material which were in some fashion bonded to the thermosetting resin and to which the thermoplastic resin was thereafter caused to adhere (see, for example, U.S. Pat. 2,219,447 to Groff, Oct. 29, 1940, or U.S. Pat. 2,797,179 to Reynolds, June 25, 1957).

Most of the adhesive systems in practice are applied from a solution and in substances which thereafter must be eliminated by volatilization, thus the use of such adhesives involves at least three processing steps; coating of surfaces, removal of the solvent and actual bonding. This latter operation usually involves the application of heat and pressure for a given length of time. Also, the use of adhesives often requires special additional equipment for the removal of solvent, coating, etc., and considerably increases the cost of production. Furthermore, the solvents may temporarily or permanently affect the properties of thermoplastic sheet stock and/or may have some undesirable effects on the properties of the core, e.g., dissolving some of the components, catalysts, inhibitors, etc. Other systems available in the prior art also do not offer a practically satisfactory bonding system for such composites. For example, several schemes using intermediate layers of fibrous material to improve bonding between thermoplastic and crosslinkable component of laminates invariably requires time-consuming steps in order to incorporate the fibrous layer on to the desired component and subsequent assembling of various layers. The number of steps increases rapidly when the production of hollow seamless and relatively deep articles is undertaken, see for example the disclosure in U.S. Pat. 2,797,179 to Reynolds. It is thus seen that such approaches have very limited application when high production rates at low cost play an important role in selection of a suitable adhesive system.

We have found that the desirable objectives, namely high speed production of such laminated structures at low cost and effective bonding after curing, can be achieved, and the disadvantage of the prior art avoided, if the thermoplastic components are modified by incorporating in them compounds having functional groups, i.e., unsaturated >C=C< groups, which form chemical bonds with the crosslinkable layer(s) when the laminated structure is subjected to the polymerization conditions enumerated in the earlier mentioned copending U.S. patent application, Ser. No. 604,255, such as by heating, radiation, diffusion of catalysts, etc. In connection with thermoplastic-crosslinkablbe laminates where the thermoplastic layers (2) are polyvinyl chloride, chlorinated polyvinyl chloride, chlorinated polyethylene and related materials, e.g., copolymers having a major proportion of these compounds and mixtures and blends, and where the crosslinkable layer(s) (1) contain at least in part mixtures of unsaturated polyester resins and at least one monomeric copolymerizable constituent containing one or more >C=CH$_2$ groups, the modifying compounds incorporated in the thermoplastic sheets should contain unsaturated groups and should not affect the desired properties of the thermoplastic sheets.

We have found that these objectives can be met if the thermoplastic sheet stock is modified by incorporating such >C=C< compounds in relatively small amounts, e.g., 0.5–15 parts and preferably 1–7 parts per 100 parts, of the thermoplastic component. It will be immediately recognized by those familiar with the art of manufacturing polymeric sheet stock that the addition of such compounds to the extrusion or molding mixtures does not require any special equipment and does not affect in any way the processing time for manufacturing these sheets since thermoplastic compositions intended for manufacturing sheets are almost regularly compounded with inhibitors, stabilizers, plasticizers, pigments, etc., or they may even contain mixtures of two or more polymers. Furthermore, it is often possible to find >C=C< compounds which also have other desirable effects in addition to improving adhesion characteristics. For example, the addition of polybutadiene improves both the adhesion and impact properties of polyvinyl chloride face sheet stock, while other unsaturated compounds may also suppress the discoloration occurring during radiation curing.

Curable polyester resins contemplated for the thermosetting core of the invention may be any of the known compositions which contain a polymeric (a) and a monomeric copolymerizable component (b), i.e., one or more ethylenically unsaturated, polymerizable polyester polymers which contain, combined by ester linkages, radicals of one or more polybasic, particularly dibasic carboxylic acids, and radicals of one or more polyhydric dibasic carboxylic acids, and radicals of one or more polyhydric alcohols, particularly dihydric alcohols. Optionally, additional radicals of one or more of the following may be incorporated; monobasic carboxylic acids one or more monhydric alcohols, and one or more hydroxy carboxylic acids, at least some of said radicals having ethylenically unsaturated polymerizable groups, and one or more monomeric, ethylenically unsaturated multifunctional polymerizable compound (c) such as styrene, α-methyl styrene, o- and p-vinyl toluene, divinylbenzene, diallylphthalate, triallylcyanurate, methyl methacrylate, ethylacrylate, ethylhexylacrylate, acrylonitrile, acrylamide, etc. The unsaturated polyester is preferably used in compositions with the said ethylenically unsaturated copolymerizable monomers which contain from 0.01 to 50, preferably 10 to 40, percent by weight of unsaturated monomers. Percentages are based on the weight of the mixture. Particularly excellent bonding, it has been found, is obtained when part of the copolymerizable multifunctional monomer includes divinylbenzene, diallylphthalate, triallylcyanurate, etc. Typical resin compositions of this kind are disclosed in U.S. Pats. 2,225,313 and 2,667,430, for example. Modified resins of this kind are also disclosed, for example, in U.S. Pats. Nos. 2,628,209 and 3,219,604.

These resin compositions can be converted into rigid structure by heating, radiation, etc., particularly in the presence of catalysts. Suitable illustrative catalysts are peroxides such as benzoyl peroxide, methyl ethyl ketone peroxide, divinyl peroxide, phthaloyl peroxide, dibenzoyl peroxide, dichlorobenzoyl peroxide, etc., and azo-bis-carboxylic acid nitriles such as azo-bis-isobutyronitrile. It is advantageous to use 0.05 to 10, preferably 0.1 to 5, percent by weight, based on the total weight of the mixture, of unsaturated polyester resin (a) and unsaturated copolymerizable monomers (c).

Suitable compounds for improving adhesion characteristics between (2) the thermoplastic polyvinyl chloride and similar face sheet stocks and (1) the thermosetting core, i.e., the crosslinkable unsaturated polyester core, can be selected from a multitude of compounds which may be either monomeric or polymeric in nature; solids or liquids, or they may be amorphous or crystalline. Their selection should be based on their efficiency as bonding agents, compatibility with the base polymer and their effect on the overall properties, as well as their availability, cost, toxicity, etc. Illustrative compounds are diallylphthalate, allylpropionate, allylbenzoate, allylisocumyl ether, vinyl glycolic acid, vinyl acetonitrile, fumaric acid, polybutadiene, butadiene-acrylonitrile rubbers [1], and the like.

Another valuable feature of the described method for improving bonding between the said thermoplastic and crosslinkable composition lies in the fact that an improved bonding performance is often achieved also in cases where an adhesive layer is applied onto the inner surfaces of the composite structure. Such a combined approach, namely the use of an adhesive and the incorporation of above-mentioned modifiers, is of great importance where the

---

[1] Illustrative compositions include, for example, rubbery butadiene-acrylonitrile copolymer containing 50% by weight of combined acrylonitrile such as that available as Hycar 1312 from B. F. Goodrich Chemical Corporation, or a composition consisting of about 34% by weight of polyvinyl chloride and 66% by weight of a rubbery butadiene-acrylonitrile copolymer which contains about 50% by weight of combined acrylonitrile available commercially from B. F. Goodrich Chemical Corporation as Hycar 1203.

use application demands a tough rather than a brittle performance.

A preferred incorporation of these additives is by compounding or dry blending the components before the sheets are produced by standard techniques such as calendering or sheet extrusion. It is obvious that in some applications it might be advantageous to prepare sheets having only a thin layer facing the crosslinkable layer modified with these bonding agents.

Although this invention has special significance for manufacturing of shaped articles from thermoplastic-sandwich assemblies by the ambient temperature deep drawing technique, according to the teaching of the earlier noted copending application Ser. No. 604,255, the use of the method and concepts presented in the present application should not in any way be restricted to a particular method of manufacturing or a particular end-use application.

The following examples in which the proportions are in parts by weight are given by way of illustration and not limitation.

EXAMPLE 1

Eight parts of a 50/50 butadiene/acrylonitrile copolymer were milled into 92 parts of polyvinyl chloride until homogeneous and molded into flat sheets. The sheets were used to sandwich a core composed of about 70 parts of a non-woven glass mat composed of two-inch long fiber glass in the form of chopped strands impregnated with about 30 parts of polyester resin solution composed of 70 parts base resin containing 23 mol percent maleic anhydride, 30 parts styrene, 2 parts divinyl benzene and 1 part benzoyl peroxide. Three layers of the impregnated glass mat were combined to form a core layer of approximately 60 mils thickness. The entire sandwich was subjected to just enough pressure to contact the face sheets with the core and "cured" at 100° C. for 10 minutes. Adhesion testing in "T" peel mode [2] showed a bonding strength of about 12 lb./lin. inch which is about 10 lb./lin. inch higher than values recorded with unmodified polyvinyl chloride sheets.

EXAMPLE 2

Conditions were the same as those for Example 1 except that the inner faces of the modified polyvinyl chloride sheets were coated with an adhesive comprising a solution of nitrile rubber and phenolic resin in methyethyl ketone and air dried. The sandwiches consisting of two layers of the modified polyvinyl chloride sheets and resin impregnated glass fabric were then "cured" at 120° C. for 15 minutes. Bond strengths in "T" peel mode of adhesion testing were 7.3 lbs./lin. inch. Control laminate sandwich structures using unmodified polyvinyl chloride sheets with Bondmaster G472 adhesive gave bond strengths of 3 lb./lin. inch.

EXAMPLE 3

Four parts of a 50/50 butadiene-acrylonitrile copolymer were milled with 96 parts of polyvinyl chloride until homogeneous and molded into flat sheets 0.025″ thick. Hycar 1312 rubber was smeared onto the inner faces of each sheet used to prepare the sandwich. The core was composed of 70 parts of glass mat impregnated with 30 parts of polyester resin solution consisting of 70 parts base resin containing 23 mol percent of maleic anhydride, 30 parts styrene, 2 parts divinyl benzene, 1 part benzoyl peroxide. The entire sandwich was cured for 10 minutes at 100° C. The adhesion bond strength was 10 lbs./lin. inch in "T" peel test mode. A control sandwich of unmodified polyvinyl chloride face sheets coated with Hycar 1312 rubber and identical core to that above yielded no bonding upon curing at 100° C. for 10 minutes.

[2] ASTM #D 1876.

EXAMPLE 4

Twelve parts of Hycar rubber 1203 were milled into 88 parts of chlorinated polyethylene having a chlorine content of 65% by weight. After milling, this material was molded into flat sheets of 15 mil thickness. These sheets were used to sandwich a core composition of about 70 parts of glass fiber, impregnated with about 30 parts of polyester resin solution composed of 70 parts base resin containing 23 mol percent maleic anhydride, 30 parts styrene, 2 parts divinyl benzene, and 1 part benzoyl peroxide.

The sandwich structure was cured for 10 minutes at 100° C. The adhesion bond strength was 11 lbs./lin. inch in "T" peel test mode which was almost three times higher than found with the specimen where unmodified face sheets of chlorinated polyethylene were used.

EXAMPLE 5

Six parts of polybutadiene were milled into 94 parts of chlorinated polyvinyl chloride having a content of clorine of 69% by weight. After milling, two sheets were molded each having a thickness of 10 mil. A sandwich structure similar to that described in Example 1, cured at 100° C. for 100 minutes, had an adhesion bond strength of 13 lbs./lin. inch in "T" peel test mode.

It will be apparent that various modifications may be effected without departing from the invention. Therefore, the several details disclosed as illustrative are not to be construed as placing limitations on the invention.

We claim:

1. A synthetic resin laminate which may be formed into shaped articles and thereafter cured to a thermosetting condition, comprising a center core layer of (1) a substantially uncured, unsaturated polyester incorporating one or more unsaturated copolymerizable multifunctional monomers and bonded on and sandwiching said center core layer, at least one face sheet comprising (2) a synthetic resinous thermoplastic polymer selected from the group consisting of polyvinyl chloride, chlorinated polyvinyl chloride and chlorinated polyethylene and blends and mixtures thereof, said thermoplastic polymer incorporating from about 0.1% to about 20.0% by weight of a compound selected from the group consisting of diallylphthalate, allylpropionate, allylbenzoate, allylioscumyl ether, vinyl glycolic acid, vinyl acetonitrile, fumaric acid, polybutadiene, and butadiene-acrylonitrile copolymer.

2. The laminate of claim 1 wherein the outer thermoplastic face sheets are different.

3. The laminate of claim 1 wherein the thermosetting core layer is glass fiber-reinforced unsaturated polyester.

4. The laminate of claim 3 wherein at least one thermoplastic face sheet comprises polyvinyl chloride.

5. The laminate of claim 3 wherein at least one face sheet comprises chlorinated polyvinyl chloride.

6. The laminate of claim 3 wherein at least one face sheet comprises chlorinated polyethylene.

7. In a method of forming a synthetic resinous thermosettable composite laminate comprising bonding an unsaturated polyester core layer between outer layers of thermoplastic resin, selected from the group consisting of polyvinyl chloride, chlorinated polyvinyl chloride and chlorinated polyethylene, said composite being of sufficient rigidity to retain the shape imparted to said composite and shaping said composite to the desired shape and curing the shaped composite, the improvement comprising introducing into said thermoplastic outer layers, prior to bonding to said core layer, from about 0.1% to about 20.0% by weight of a compound selected from the group consisting of diallylphthalate, allylpropionate, allylbenzoate, allylisocumyl ether, vinyl glycolic acid, vinyl acetonitrile, fumaric acid, polybutadiene, and butadiene-acrylonitrile copolymer.

8. The method of claim 7 wherein said compound is blended into said outer layer.

9. The method of claim 7 wherein the compound is incorporated by introducing it at the interface of said core layer and said outer layer.

10. The process of claim 7 wherein said thermoplastic outer layer is modified by laminating thereto a polymeric film containing said compound.

References Cited

UNITED STATES PATENTS

| | | | |
|---|---|---|---|
| 2,552,904 | 5/1951 | Newberg et al. | 260—32.4 |
| 2,572,877 | 10/1951 | Morris et al. | 156—314 |
| 2,652,383 | 9/1953 | Davis | 260—44 |
| 2,924,545 | 2/1960 | Daly | 161—A.B.S. Digest |
| 3,060,147 | 10/1962 | Schlegel | 161—233X |
| 3,206,354 | 9/1965 | Pooley | 161—161 |
| 3,257,266 | 6/1966 | Sapper | 161—233X |

JOHN T. GOOLKASIAN, Primary Examiner

J. C. GIL, Assistant Examiner

U.S. Cl. X.R.

117—138.8, 161; 161—253, 254; 260—884, 891